(12) United States Patent
Blankenship et al.

(10) Patent No.: US 11,370,716 B2
(45) Date of Patent: Jun. 28, 2022

(54) ASPHALT CEMENT CONCRETE INTERLAYER SYSTEM FOR REFLECTIVE CRACK RELIEF

(71) Applicants: Phillip B. Blankenship, Richmond, KY (US); Joseph A. Dennis, Lebanon, OH (US)

(72) Inventors: Phillip B. Blankenship, Richmond, KY (US); Joseph A. Dennis, Lebanon, OH (US)

(73) Assignee: Surface-Tech LLC, Portland, OR (US)

( * ) Notice: Subject to any disclaimer, the term of this patent is extended or adjusted under 35 U.S.C. 154(b) by 371 days.

(21) Appl. No.: 16/697,825

(22) Filed: Nov. 27, 2019

(65) Prior Publication Data

US 2021/0155557 A1 May 27, 2021

(51) Int. Cl.
*C04B 41/45* (2006.01)
*C08L 95/00* (2006.01)
*C04B 28/04* (2006.01)
*C04B 111/00* (2006.01)

(52) U.S. Cl.
CPC .......... *C04B 41/4596* (2013.01); *C04B 28/04* (2013.01); *C08L 95/00* (2013.01); *C04B 2111/00482* (2013.01)

(58) Field of Classification Search
CPC ...... C08L 11/02; C08L 33/20; C08L 2201/08; C08L 2203/18; C08L 2205/025; C04B 41/4596; C04B 2111/00482; C04B 28/04
See application file for complete search history.

(56) References Cited

U.S. PATENT DOCUMENTS

| | | | | |
|---|---|---|---|---|
| 5,836,715 A | * | 11/1998 | Hendrix | B29C 70/222 404/70 |
| 6,263,629 B1 | * | 7/2001 | Brown, Jr. | E04C 2/044 442/179 |
| 2021/0371339 A1 | * | 12/2021 | Dennis | C04B 20/1029 |

* cited by examiner

*Primary Examiner* — Robert D Harlan
(74) *Attorney, Agent, or Firm* — Mersenne Law

(57) ABSTRACT

An asphalt-cement concrete ("ACC") interlayer formed of a plant-mix material reinforced with aramid fibers, deposited at a thickness of at least one inch (1") over a Portland-cement concrete ("PCC") or ACC base, can extend the service life of a hot-mix asphalt ("HMA") surface layer installed over the interlayer by retarding or preventing "reflected" cracks—cracks in the surface layer that correspond to cracks, damage and irregularities in the PCC or ACC base. When the surface layer's useable life has expired, it can be removed and replaced, and the interlayer can continue to protect the new surface layer.

8 Claims, 4 Drawing Sheets

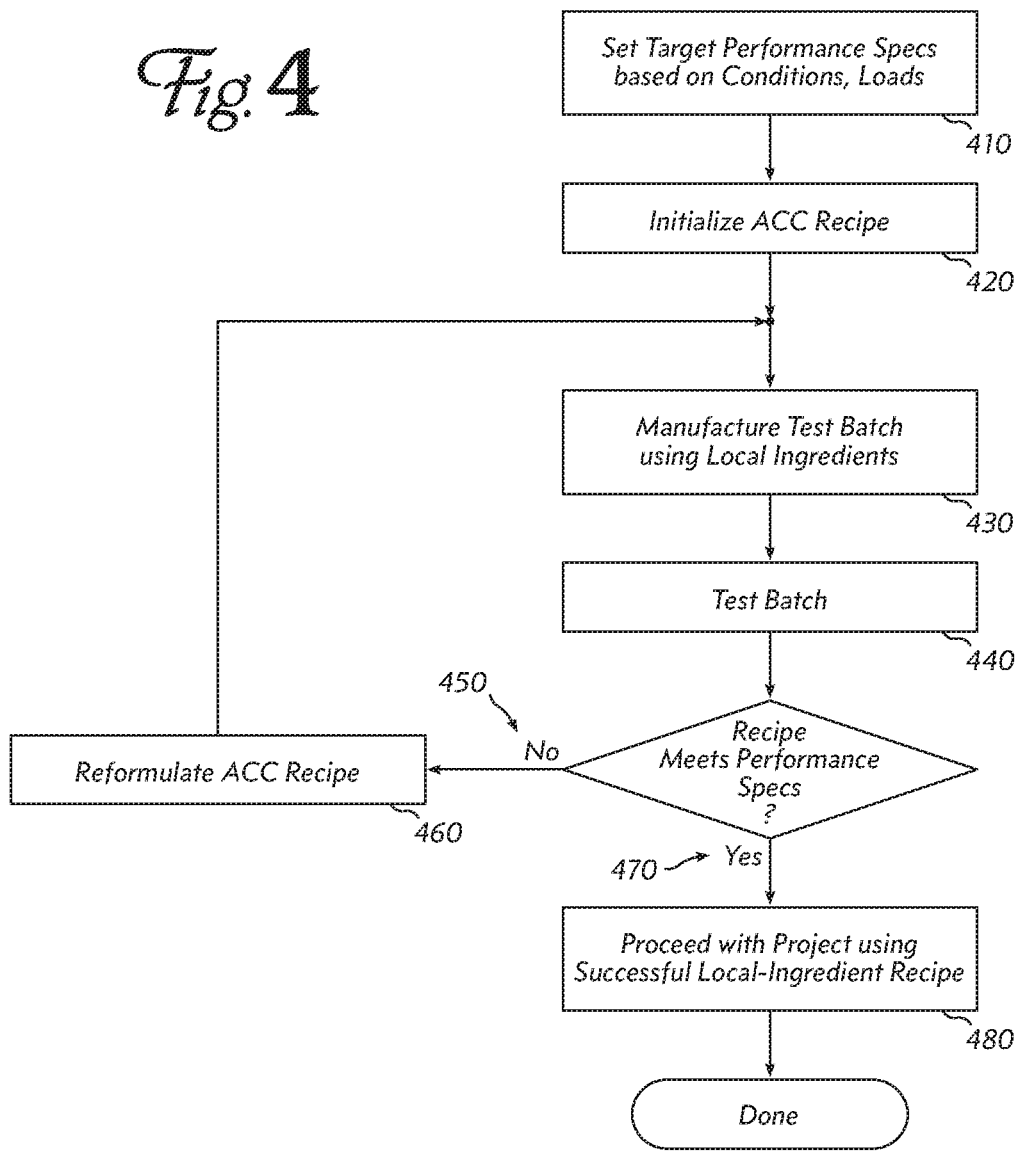

ASPHALT CEMENT CONCRETE INTERLAYER SYSTEM FOR REFLECTIVE CRACK RELIEF

CONTINUITY AND CLAIM OF PRIORITY

This is an original U.S. patent application.

FIELD

The invention relates to heterogenous layered structures for asphalt cement concrete. More specifically, the invention relates to an engineered asphalt cement concrete interlayer for improving the performance and longevity of a multi-layer asphalt paving system.

BACKGROUND

Asphalt Cement Concrete ("ACC," or often just "asphalt") is widely used as a paving material to surface roads, runways and parking lots. By some estimates, up to 90% of all such surfaces are made with ACC. A basic asphalt concrete comprises asphalt (also known as bitumen), a highly-viscous or semi-solid form of petroleum; and aggregates such as stone, sand or gravel, in about a 1:19 ratio (5% asphalt, 95% aggregate). The ingredients are heated, mixed, spread on the surface to be paved (often an earthen, stone or crushed-rock bed) and compacted to form ACC.

One common application for ACC is as an overlay to restore deteriorating Portland cement concrete ("PCC") surfaces (old ACC surfaces can also be repaired with a new ACC overlay). In these repairs, the ACC is of a type known as hot mix asphalt ("HMA"). Overlays protect the existing pavement structure and provide a new, smoother, skid-resistant riding surface. According to American Society of Civil Engineers (ASCE) 2017 report card, the U.S. highway system has been underfunded, resulting in $836 billion backlog of capital needs of which $420 billion is to repair our highways.

However, PCC is a rigid pavement, while hot mix asphalt (HMA) is a flexible pavement. This mismatch of moduli (strengths) results in cracks forming in the HMA overlay as a result of the underlying concrete pavement joints (and other irregularities and damage in the PCC). The cracks are commonly called "reflective cracks" (or "reflective cracking") as shown in FIG. 2. Reflective cracks usually begin to appear in the new HMA surface within one or two years, depending on the thickness of the overlay. It is common to see all cracks reflect through the new overlay within three to five years. It is common to see cracks re-appear at a rate of 25% per year after the first year. As a general rule of thumb, it is commonly said that cracks move upward at about one inch per year.

Asphalt rubber interlayers, fabrics, and other methods have been used to address this problem. The performance of these methods has varied greatly. An Army Corps of Engineers study concluded that while some of the methods work well over flexible pavements in warm climates, the performance has been generally unsatisfactory in cold climates, and the use of asphalt rubber membranes is not effective over PCC in any climate. Most of the existing reflective crack relief methods and their specifications mainly address tension, that is, controlling horizontal movement at the crack or joint interface. But there are actually three forces that need to be addressed: horizontal non-load movement (tension), vertical (shear) load induced movements, and bending or parallel movement under laterally unstable conditions. The shear movement is usually the movement that causes the quickest reflective cracks. This movement is from a lack of load transfer in the PCC joint and usually called a moving joint.

New approaches and new structures for retarding or preventing reflective cracking in PCC (and ACC) resurfacing operations may be of significant value in this industry.

SUMMARY

Embodiments of the invention provide an interlayer of asphalt-cement concrete comprising aramid fibers in a plant-mix material, installed over a PCC (or ACC) surface to be restored. The aramid-modified interlayer can withstand instability from irregularities in the underlying pavement and reduce the tendency of those irregularities to manifest as cracks and other damage in the travel surface.

BRIEF DESCRIPTION OF DRAWINGS

FIG. 4 is a flow chart outlining another method according to an embodiment.

DETAILED DESCRIPTION

Figure 1:
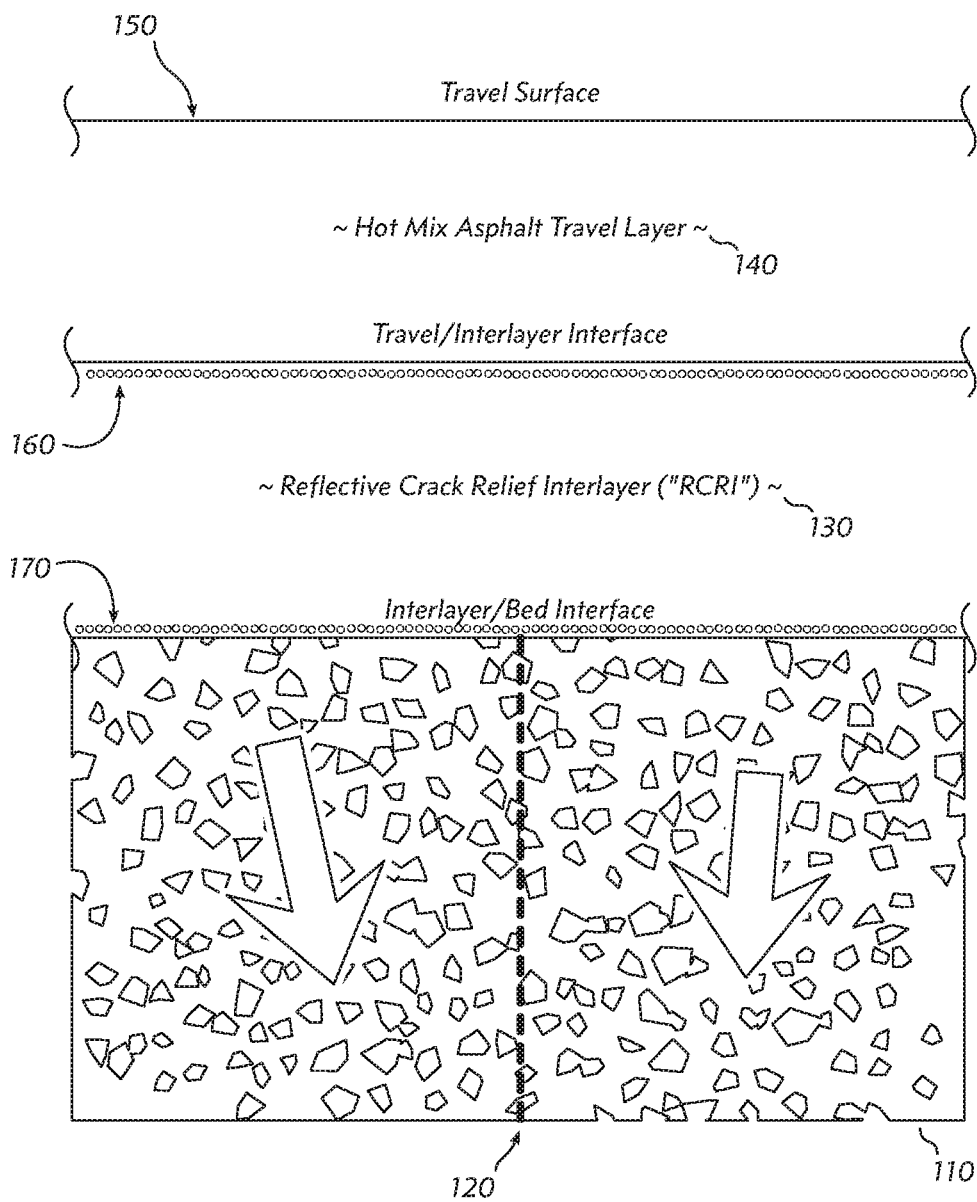
FIG. 1 shows a typical layer stack-up of an embodiment of the invention.

Basic asphalt cement concrete can be formulated to meet a modest range of performance metrics (rutting, shifting, cracking) over a modest range of conditions (temperature, traffic load). Higher-performance ACC can be formulated with the addition of polymerizing agents; these give access to much higher performance ranges and wider conditions, but they raise the cost of the ACC significantly. More recently, aramid-fiber amendments and manufacturing methods (including specifically the ACE product from Surface Tech of California, which is described in U.S. Pat. Nos. 9,469,944 and 9,926,672) allow pavement engineers to access intermediate performance and condition ranges, at costs that are also moderate. Embodiments of the present invention apply this new, intermediate-performance asphalt in a new role to improve the performance (i.e., traffic and economic performance) and maintainability of an ACC paving system.

Embodiments of the invention improve the performance and longevity of repairs to damaged pavement (which may be Portland-cement concrete pavement, asphalt-cement concrete pavement, or a prior asphalt resurfacing of PCC pavement). A damaged pavement surface is ground back far enough to reach a portion that is still sound and/or useable as a base. Next, an aramid-fiber-reinforced interlayer of asphalt is deposited. In a preferred embodiment, the aramid fiber is provided by introducing a suitable dose of the ACE product from Surface Tech of California into the interlayer asphalt mix; this mix is deposited at a thickness of about 1". Finally, an asphalt surface (travel) layer is deposited over the interlayer. The thickness of the surface layer depends on the traffic profile that the pavement is designed to withstand. Surface thickness may range from 1.5" to 3.5" or more.

Embodiments also recognize the impact of local material variations on the performance and economic cost of a pavement repair system. Many components of an asphalt cement concrete must be sourced locally to the installation—it is economically infeasible to ship sand, gravel and other bulk materials from a distant source to a plant where they will be mixed (or, equivalently, to ship the mixed asphalt from a distant plant to a road-repair location). However, the "gravel" or "sand" available in one location may have different properties from "gravel" or "sand" in another location—for example, "No. 8 (2.36 mm)" gravel from one source may differ in type, angularity, porosity and/or hardness from the identically-named "No. 8" gravel from a different source. Similarly, the types of liquid binder available (and their costs) may vary from place to place; and it may be important to be able to substitute a slightly different (often cheaper) binder. In addition, each manufacturing plant performs slightly differently, even with the same equipment and processing conditions. These differences may result in a recipe that was proven in one location being nonconforming when manufactured elsewhere. Thus, local adaptations of a basic aramid-fiber-reinforced ACC recipe may be important to achieve optimal engineered performance at a favorable price.

FIG. 1 shows a side view or section of a portion of pavement constructed according to an embodiment of the invention. At the base (bottom), a bed comprising a gravel or stone aggregate is shown (110). This is often a pre-existing Portland cement concrete pavement, which may have cracks, damage, defects or other irregularities such as the expansion joint shown at 120. These irregularities allow different portions of the bed to move differently under load, as suggested by the misaligned, differently-sized arrows. Irregular motion may be characterized as "rocking slabs," with poor load transfer from PCC slab to slab, which an engineer may seek to stabilize before repair, or may address with an interlayer like the one described herein.

Over the bed 110, a reflective crack relief interlayer ("RCRI") 130 is installed. The RCRI is a key portion of an embodiment of the invention, and will be described in greater detail below.

Over the RCRI, a hot-mix asphalt travel layer 140 is installed. The top surface of the travel layer 150 is largely exposed and visible as the travel surface (it is understood that the surface may be partly or fully covered with paint, markers or other objects necessary for traffic control or similar purposes). An embodiment may include a geotextile layer, e.g. at 160 or 170, interposed between two adjacent layers, but this is not an essential part of an embodiment. A pavement that omits such layers will still perform well, and will cost less to construct.

Figure 2:
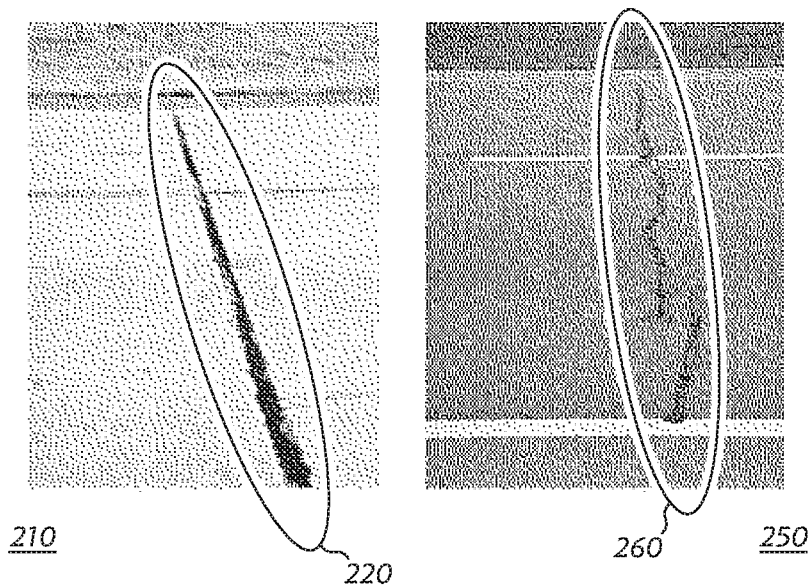
FIG. 2 shows images of a prior-art pavement repair.

An embodiment helps correct a problem encountered when a hot-mix asphalt cement concrete travel layer is installed directly over a damaged or irregular bed, such as a legacy Portland-cement concrete roadway. FIG. 2 shows a photo of a Portland cement concrete pavement, 210, and the same pavement after an asphalt cement concrete resurfacing layer (alone) has been placed in service for six (6) months, 250. Note that a crack 260 has appeared in the repaired surface; this crack corresponds to the expansion joint 220 in the original Portland cement concrete bed. This type of damage is called "reflective cracking." It results from stresses and strains on the repair surface caused by tension and horizontal movement occurring between portions of the underlying bed.

Figure 3:
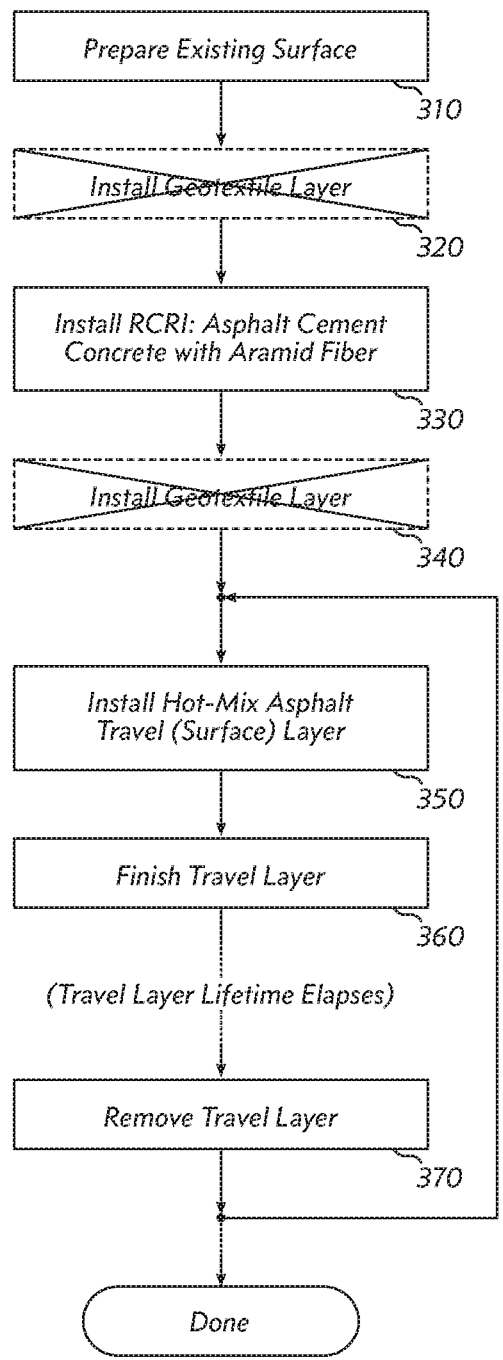
FIG. 3 is a flow chart outlining a method according to an embodiment.

An embodiment can improve the performance and longevity of a reconditioned, restored or repaired pavement by proceeding in accordance with the method outlined in FIG. 3. First, the existing pavement is prepared for further work (310). Preparations may include removing (e.g., by grinding) previous failed surfaces to reach a sound base, or filling or patching holes in the existing surface. If the existing pavement is judged to be adequate as-is, preparation may be as simple as sweeping or removing large debris.

In prior-art constructions, a geotextile sheet might be placed over the prepared pavement (320). But when an embodiment of the invention is in use, the sheet is not necessary and can be omitted to save expense and construction time.

Now, a reflective crack relief interlayer (RCRI) is installed (330). The RCRI is a modified asphalt-cement concrete material, comprising gravel, aggregate, sand, bitumen, optional modified polymer binders, and—significantly—aramid fibers to allow the RCRI to meet performance specifications chosen to ensure proper performance and long life in view of the loads that the finished restored pavement is designed to support. In a preferred embodiment, an aramid-fiber additive prepared as described in U.S. Pat. No. 9,926,672 is used. In the preferred embodiment, the RCRI asphalt cement concrete is a plant-mixed material where aramid fibers bound together by a meltable wax are introduced at or near the mix stage so that the fibers are distributed evenly throughout the interlayer mix. In a preferred embodiment, the aramid fibers are at least 1½" (38 mm) long. A mixture of fiber lengths may be used, but in this case also, a median fiber length of at least 1½" is preferred. Introducing the aramid amendment product into a Continuous Drum Plant through the RAP collar, or into the weigh hopper of a Batch Plant, usually provides the best product consistency. Dosing all at once will not provide the best dispersion of aramid fiber throughout the RCRI material. A continuous, automatic metering system designed specifically to measure and dispense asphalt amendments in the form and at the concentrations appropriate for the ACE® product will improve confidence that the bulk asphalt mix will match test samples whose properties satisfy engineering target ranges. The RCRI should be at least 1" thick, but generally need not be much thicker than about 2".

In an alternate prior-art construction, a geotextile sheet may be placed over the interlayer (340). But when an aramid-reinforced RCRI according to an embodiment is used, this sheet may also be omitted.

Finally, a conventional hot-mix asphalt travel layer is installed over the RCRI (350). The thickness of the travel layer depends on the traffic load; for a project expected to serve up to 3,000,000 20-year Equivalent Single Axial Loads ("ESALs"), the travel layer should be at least 1.5" thick. For 3M-10M ESALs, a 2.5" travel layer is indicated. A 3.0" travel layer can serve 10M to 30M ESALs, while a pavement serving even more traffic should be at least 3.5" thick.

When the travel layer is complete, it may be adorned with traffic markings, Botts' dots, rumble strips, or other surface features (360).

When the travel layer's service life has elapsed (typical design life targets are 5-10 years), the pavement may be restored by removing the travel layer (i.e., back to the RCRI) (370), and repeating steps 350-360. The RCRI may retain its structural and functional integrity for two or more restorative cycles before it, too, must be removed and replaced.

Reflective Crack Relief Interlayer Compositions

The RCRI according to an embodiment is a modified plant-mix asphalt cement concrete material. Many of the ingredients are conventional, and conventional modifications to the recipe have the expected results. In one embodiment, a basic mixture may include ⅜" (4.75 mm) Nominal Maximum Size Aggregate ("NMAS") with an asphalt content from about 7% to about 10%, compacted to achieve an air-void percentage from about 0.5% to about 2.5%. The mineral aggregate fraction ("VMA") is preferably around 16%, and the in-place density is about 96-98% of Gmm (maximum).

Conventional interlayer specifications for such a product would include highly polymer modified liquid asphalt requirements as a critical ingredient, and a volumetric mix design. An ACC interlayer mix application is a razor-edge design that is focused on absorbing the high movement of the PCC joint while being just stiff enough to not rut. It is very difficult to achieve adequate performance at any point in a resurfacing project, and virtually impossible to achieve satisfactory performance over any significant distance or area.

An embodiment improves upon conventional ACC interlayer mixes by adding aramid fiber (e.g. via the ACE product from Surface Tech). This fiber reduces the need for expensive polymer-modified binders, and reduces cracking seen in a flexural beam fatigue test when compared to traditional non-modified asphalt by over 90% at 600 microstrains and by over 200% at 900 microstrains. This is significant because most bottom-up (reflective) cracking is in the 600+ microstrain range. The aramid-modified ACC used in an embodiment is a new, plant-made and paver-laid asphalt interlayer design that provides ten times the crack resistance of a conventional asphalt interlayer. Further, this ACC will meet the expected performance criteria no matter where the product is made, allowing the benefits of the present interlayer system to be enjoyed throughout the United States.

ACC interlayers according to an embodiment also allow for more accurate control of pavement characteristics such as water permeability—the aramid fiber helps control water infiltration, so the finished interlayer may be impermeable or semi-impermeable. Controlling permeability is important in high-rainfall areas, and in areas with exposure to freezing temperatures; keeping the water out of the base or foundation of the pavement system will extend the life of the pavement system.

In a preferred embodiment, aramid fiber is introduced at a dosage from about 4 oz. per plant-ton of ACC mix, to about 10 oz. per plant-ton, with standard asphalt binder graded by the high and low temperatures of the project location. ACC used in an RCRI according to an embodiment should fall into the following performance ranges:

begin cracking between 20,000 and 40,000 beam-fatigue test cycles is suitable for moderate to severe cracking ACC or jointed PCC applications with a service life of 10 to 15 years. An asphalt that tests out to begin cracking between 40,000 cycles and 80,000 cycles is suitable for moderate to severe cracking ACC or jointed PCC applications with a service life of 15 years or more.

Embodiments may also be characterized by their performance in Hamburg Wheel rutting tests, with a target range from 5,000 to 20,000 passes (ideally, targeting the optimal range of 7,000 to 15,000 passes). When characterized using the Indirect Tensile Cracking Test ("IDEAL-CT"), an index between about 650 and about 1,800 provides good results for an embodiment. Ultimately, the rutting test (Hamburg Wheel Rutting Test) and one cracking test (Flexural Beam Fatigue Test or IDEAL-CT Test) should be met in order to provide the desired performance for the embodiment.

Recipe Localization—Material Sourcing Considerations

As mentioned earlier, many of the ingredients of an Asphalt Cement Concrete intended for use as a Reflective Crack Relief Interlayer according to an embodiment of the invention, must (for all practical purposes) be sourced locally to the pavement installation. And, because of differences between nominally-equivalent ingredients, it is often important to formulate and test ACC samples to ensure that the locally-manufactured RCRI will perform in accord with engineering projections. A recipe that works in one location may perform unacceptably in a different location having similar conditions, because e.g. the gravel, sand, bitumen or other conventional ingredient available at the second location is different from the same-named ingredient that was used in the first location.

Thus, in one aspect, an embodiment of the invention comprises activities to develop a recipe to meet desired test-performance specifications, using a particular set of locally-available conventional ingredients along with the aramid-fiber reinforcements and optional polymer binders. FIG. 4 outlines this recipe-development process.

First, an engineer sets target performance specifications based on conditions and expected loads for a RCRI interlayer (410). An initial ACC recipe is chosen (420), perhaps from a catalog of previously-developed recipes, and perhaps as modified by the engineer's judgment. All ACC recipes of an embodiment comprise aramid reinforcing fibers, which are introduced into the ACC during mixing/manufacturing.

| Performance- Based Testing for Aramid Reinforced RCRI | | | | |
|---|---|---|---|---|
| Purpose | Performance Test | Method | Test Temp[1] | Target Criteria |
| Rutting | Hamburg Wheel Tracker passes to ½" (12.5 mm) rutting | AASHTO T324 | 40, 45, or 50 C. | 5,000-20,000 passes (optimal range 7,000-15,000) |
| Reflective Cracking | Indirect Tensile Cracking Test (IDEAL-CT) | ASTM D8225 | 13, 20, or 25 C. | 650-1,800 index |
| | | | or | |
| | Repeated Flexural Beam Fatigue | AASHTO T321 | 10, 15, or 20 C. | 20,000-40,000 cycles with polymer: 40,000-80,000 cycles |

[1]Testing temperature is determined by climate. Rutting test temperature is determined by PG 52, 58, and 64-xx 98% reliable climates, respectively. Cracking test temperature is determined by PG xx-34, 34, and 22 98% reliable climates, respectively.

In another aspect of the invention, embodiments can be tuned for particular use cases by setting the aramid-fiber dose used in the interlayer (RCRI) asphalt mix to target a range of beam-fatigue cycles. An asphalt that tests out to Now, a test batch of ACC is manufactured, using the ACC recipe and locally-sourced ingredients (430). (The aramid reinforcing fibers are not a heavy or bulky ingredient, nor are they used in large quantities, so they may be provided from any available source. Shipping and handling of these fibers is not a significant cost driver.) The batch is tested as discussed above (440), e.g. by Hamburg Wheel rutting testing, IDEAL-CT crack testing, or flexural beam fatigue testing.

If the current ACC recipe does not meet the desired performance specifications (450), then the engineer may reformulate the recipe to use different conventional ingredients, more or less aramid reinforcing fiber, or higher-performance polymer binders (460). Another test batch of the reformulated recipe is made (430) and tested (440).

Once an ACC recipe, made with locally-available ingredients, satisfies the project's performance specifications (470), the project can proceed with the suitably-modified ACC RCRI recipe according to this embodiment.

The applications of the present invention have been described largely by reference to specific examples and in terms of particular structural arrangements. However, those of skill in the art will recognize that improved pavement restoration can also be achieved by interlayer systems that include components different and/or beyond the aramid-modified reflective crack relief interlayer herein described. Such variations and implementations are understood to be captured according to the following claims.

We claim:

1. An asphalt cement concrete interlayer system for resurfacing a Portland cement concrete surface, comprising:
a reflective crack relief interlayer ("RCRI") comprising an aramid fiber-reinforced asphalt cement concrete installed over a Portland cement concrete surface; and
an asphalt cement concrete travel surface installed over the RCRI.

2. The asphalt cement concrete interlayer system of claim 1 wherein the RCRI is installed directly upon the Portland cement concrete surface.

3. The asphalt cement concrete interlayer system of claim 1 wherein the asphalt cement concrete travel surface is installed directly upon the RCRI.

4. The asphalt cement concrete interlayer system of claim 1 wherein the RCRI comprises plant-mix asphalt cement concrete dosed with aramid fibers in a meltable wax binder during a mixing process.

5. The asphalt cement concrete interlayer system of claim 4 wherein the plant-mix asphalt cement concrete is dosed with aramid fibers at a dosage of at least 4 oz. per plant-ton.

6. The asphalt cement concrete interlayer system of claim 4 wherein the plant-mix asphalt cement concrete is dosed with aramid fibers at a dosage of no more than 10 oz. per plant-ton.

7. The asphalt cement concrete interlayer system of claim 1 wherein the RCRI is at least one inch (1") thick.

8. The asphalt cement concrete interlayer system of claim 1 wherein the RCRI is no more than two inches (2") thick.

* * * * *